United States Patent
Oda et al.

(10) Patent No.: US 9,533,482 B2
(45) Date of Patent: Jan. 3, 2017

(54) MASKING SYSTEM USING MASKING PIECE

(71) Applicant: FANUC Corporation, Minamitsuru-gun, Yamanashi (JP)

(72) Inventors: Masaru Oda, Yamanashi (JP); Kazuhisa Otsuka, Yamanashi (JP); Mitsuhiro Okuda, Yamanashi (JP); Eiichirou Nagasue, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 112 days.

(21) Appl. No.: 14/294,581

(22) Filed: Jun. 3, 2014

(65) Prior Publication Data

US 2014/0261963 A1 Sep. 18, 2014

Related U.S. Application Data

(63) Continuation of application No. 13/293,491, filed on Nov. 10, 2011, now Pat. No. 8,770,247.

(30) Foreign Application Priority Data

Feb. 9, 2011 (JP) .................................. 2011-026006

(51) Int. Cl.
*B32B 37/00* (2006.01)
*B32B 37/30* (2006.01)
(Continued)

(52) U.S. Cl.
CPC ................. *B32B 37/30* (2013.01); *B05D 1/32* (2013.01); *B25J 9/0084* (2013.01);
(Continued)

(58) Field of Classification Search
CPC .. B05B 13/0431; B05B 15/045; B05C 21/005; B05D 1/32; B25J 11/0075; B25J 15/0066; B25J 9/0084; B32B 37/00; B32B 37/0046; B32B 37/12
(Continued)

(56) References Cited

U.S. PATENT DOCUMENTS 5,464,692 A * 11/1995 Huber .......................... 428/343
2004/0186624 A1 9/2004 Oda et al.
(Continued)

FOREIGN PATENT DOCUMENTS

DE 102004039410 A1 2/2006
DE 102007031835 B4 4/2009
(Continued)

OTHER PUBLICATIONS

German Office Action dated May 29, 2012 in corresponding DE Application No. 10 2011 055 709.1.
(Continued)

*Primary Examiner* — George Koch
(74) *Attorney, Agent, or Firm* — Hauptman Ham, LLP (57) ABSTRACT

In a masking system a robot performs first conveyance work of making an object gripping unit grip an object and set the object at a predetermined position based on positional information of the object which was detected by a first detection unit, coating work of making a coating unit coat an adhesive on a masking location of the object which is set at the predetermined position, and second conveyance work of making a masking piece gripping unit adhere a masking piece to the masking location of the object based on positional information of the masking piece which was detected by a second detection unit.

16 Claims, 8 Drawing Sheets

(51) Int. Cl.
  *B25J 9/00* (2006.01)
  *B25J 11/00* (2006.01)
  *B25J 15/00* (2006.01)
  *B05D 1/32* (2006.01)
  *B32B 37/12* (2006.01)
  *B05B 13/04* (2006.01)
  *B05B 15/04* (2006.01)
  *B05C 21/00* (2006.01)

(52) U.S. Cl.
  CPC ....... *B25J 11/0075* (2013.01); *B25J 15/0066* (2013.01); *B32B 37/0046* (2013.01); *B32B 37/12* (2013.01); *B05B 13/0431* (2013.01); *B05B 15/045* (2013.01); *B05C 21/005* (2013.01)

(58) Field of Classification Search
  USPC ..... 156/351, 367, 368, 378, 379; 901/43, 50
  See application file for complete search history.

(56) References Cited

U.S. PATENT DOCUMENTS

2007/0281100 A1  12/2007  Herre et al.
2009/0025199 A1  1/2009  Hariki et al.

FOREIGN PATENT DOCUMENTS

| DE | 102009036838 A1 | 2/2011 |
| JP | 61033880 A1 | 2/1986 |
| JP | 63013336 A1 | 1/1988 |
| JP | 64027885 A1 | 1/1989 |
| JP | 06-011859 U1 | 2/1994 |
| JP | 06-099118 A | 4/1994 |
| JP | 9141577 A1 | 6/1997 |
| JP | 9141578 A1 | 6/1997 |
| JP | 11253848 A1 | 9/1999 |
| WO | 2005065844 A1 | 7/2005 |
| WO | 2011018199 A1 | 2/2011 |

OTHER PUBLICATIONS

Translation of Detailed Description of JP 09-141578. Published Jun. 3, 1997. Inventor Uchiumi Noriyhuki.
Translation of Claims of JP 09-141578. Published Jun. 3, 1997. Inventor Uchiumi Noriyuhuki.
Translation of JP 09-141577A. Inventor: Uchiumi Noriyuki; Date of Publication of Application: Jun. 6, 2007.

* cited by examiner

MASKING SYSTEM USING MASKING PIECE

RELATED APPLICATIONS

The present application is a continuation of U.S. application Ser. No. 13/293,491 now U.S. Pat. No. 8,770,247, filed Nov. 10, 2011, which claims priority to Japanese Application No. 2011-026006, filed Feb. 9, 2011, the disclosures of which are hereby incorporated by reference herein in their entirety.

TECHNICAL FIELD

The present invention relates to a masking system which performs masking work in advance for obtaining a non-painted location at the time of painting.

BACKGROUND ART

If there is a place where paint is not desired in painting work, that place is covered with masking tape. Alternatively, that place is covered by a masking sheet and the ends of the masking sheet are attached by masking tape.

Further, in Japanese Patent Publication (A) No. 6-99118, a masking member is placed on one surface of the object to be painted and magnets are placed at the other surface so as to fasten the masking member in place. With this technique, the masking member will not shift at the time of painting. Further, the masking member can be easily attached and detached.

However, when using only masking tape and when attaching a masking sheet by masking tape, masking a desired shape is troublesome. Skill on the part of the worker becomes necessary. The same is true even if using a masking material comprised of a polyethylene or polyurethane resin etc.

Further, when coating a masking member together with the workpiece, it is difficult to accurately trace the shape of the workpiece. This can become a cause of a drop in painting quality. Further, the technique of using magnets to fasten a masking member such as in Japanese Patent Publication (A) No. 6-99118 sometimes cannot be applied depending on the material or shape of the workpiece, so lacks general applicability.

The present invention was made in consideration of this situation and has as its object the provision of a system facilitating masking work for all types of workpieces without requiring skill on the part of the worker.

SUMMARY OF INVENTION

To achieve the above object, according to a first aspect, there is provided a masking system comprising a first detection unit which detects a position of an object, an object gripping unit which grips the object, a coating unit which coats an adhesive, a masking piece gripping unit which grips a masking piece to be attached to a masking location of the object, a second detection unit which detects a position of the masking piece which is gripped by the masking piece gripping unit, and a robot, wherein the robot performs first conveyance work of making the object gripping unit grip the object and set the object at a predetermined position based on positional information of the object which was detected by the first detection unit, coating work of making the coating unit coat an adhesive on a masking location of the object which is set at the predetermined position, and second conveyance work of making the masking piece gripping unit adhere the masking piece to the masking location of the object based on positional information of the masking piece which was detected by the second detection unit.

According to the second aspect, there is provided the first aspect wherein the adhesive is water soluble and has the property of increasing in viscosity by a decrease in water content and wherein the masking piece includes a water-absorbing material.

According to the third aspect, there is provided the first or second aspect wherein the masking piece is cardboard.

According to the fourth aspect, there is provided any of the first to third aspects wherein the adhesive is a material mainly comprised of natural rubber latex.

According to the fifth aspect, there is provided any of the first to fourth aspects wherein at least two of the first conveyance work, the second conveyance work, and the coating work are executed by different robots.

These objects, features, and advantages of the present invention and other objects, features, and advantages will become further clearer from the detailed description of typical embodiments shown in the attached drawings.

DETAILED DESCRIPTION

Below, embodiments of the present invention will be explained while referring to the attached drawings. In the following drawings, similar members are assigned similar reference notations. To facilitate understanding, these figures are suitably changed in scale.

Figure 1:
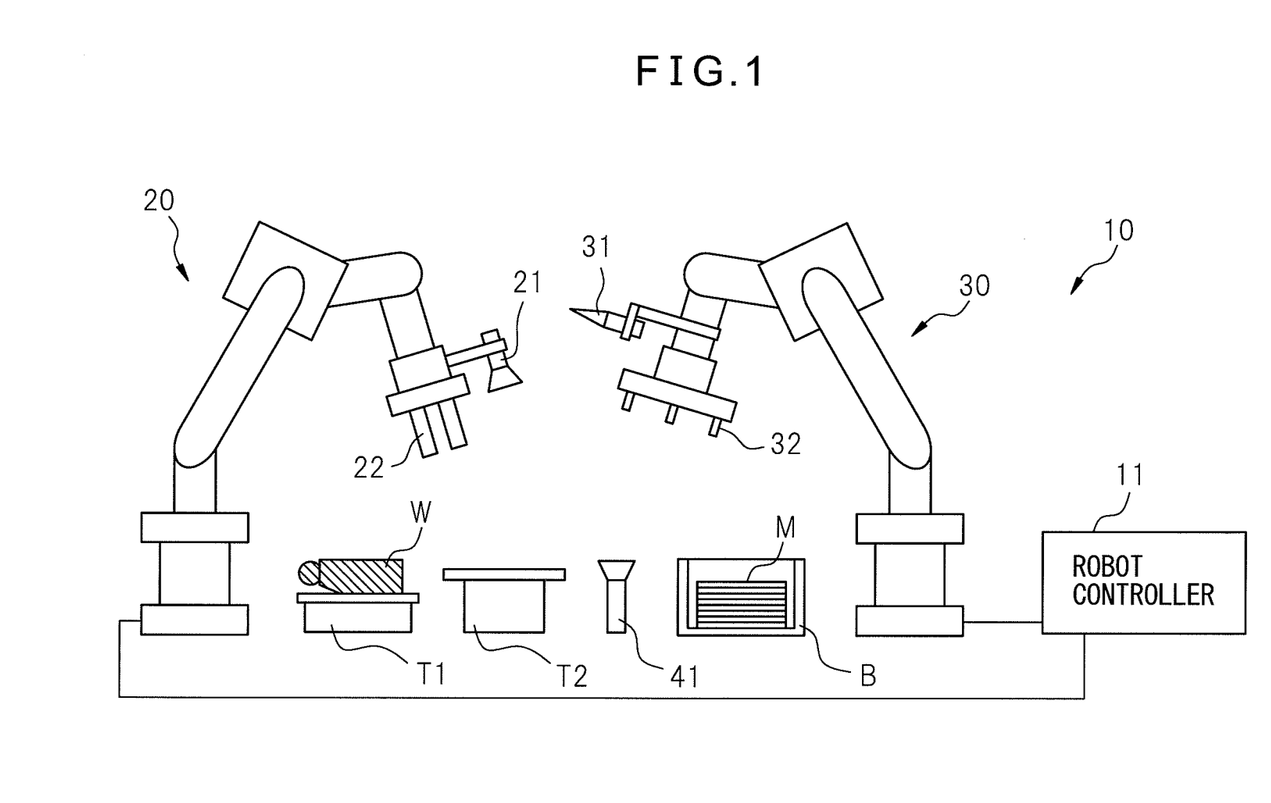
FIG. 1 is a schematic view of a masking system based on the present invention.

FIG. 1 is a schematic view of a masking system based on the present invention. In the embodiment shown in FIG. 1, the masking system 10 includes multiarticulated robots with six degrees of freedom, that is, a first robot 20 and a second robot 30. These first robot 20 and second robot 30 are connected to a robot controller 11. The robot controller 11 is a digital computer which controls the overall operation of the first robot 20 and the second robot 30 and performs various processing explained later.

As shown in FIG. 1, near the front end of the arm of the first robot 20, a first vision sensor 21 which detects the positional information of the workpiece W is attached. Further, at the front end of the arm of the first robot 20, a hand 22 which grips the workpiece W is provided. As opposed to this, near the front end of the second robot 30, a coating unit 31 which coats an adhesive from a not shown adhesive source is attached. Furthermore, at the front end of the arm of the second robot 30, a suction part 32 which picks up a masking piece M by suction is provided. The suction pickup action by the suction part 32 is performed by a vacuum source (not shown) connected to the suction part 32.

Here, the adhesive which is coated from the coating unit 31 is preferably one which is water soluble and has the property increasing in viscosity due to a reduction in its water content. The reason is that when the later explained masking piece M includes a water-absorbing material, the adhesion of the adhesive is enhanced. Alternatively, the adhesive which is coated from the coating unit 31 may be a material mainly comprised of a natural rubber latex. In that case, it will be clear that the adhesive can be easily disposed of alone or together with the masking piece M.

Further, as can be seen from FIG. 1, a workpiece W is carried on the table T1. Here, the workpiece W is, for example, a frame of an arm forming a not shown robot. It may also be another type of workpiece W. Further, the holding box B holds a large number of masking pieces M. These masking pieces M are sheet-shaped members of the same shape as each other, for example, pieces of cardboard of the same shapes, and are held stacked together inside the holding box B.

Furthermore, a staging table T2 for temporarily carrying the workpiece W is also illustrated. Further, near the staging table T2, a second vision sensor 41 which has similar functions to the first vision sensor is installed fastened to the floor of the work location. These table T1, staging table T2, second vision sensor 41, and holding box B are positioned within the operating ranges of the first robot 20 and second robot 30. Further, the positional relationships and dimensions of the table T1, staging table T2, second vision sensor 41, and holding box B are assumed to be stored in a memory part (not shown) of the robot control device 11.

Figure 2:
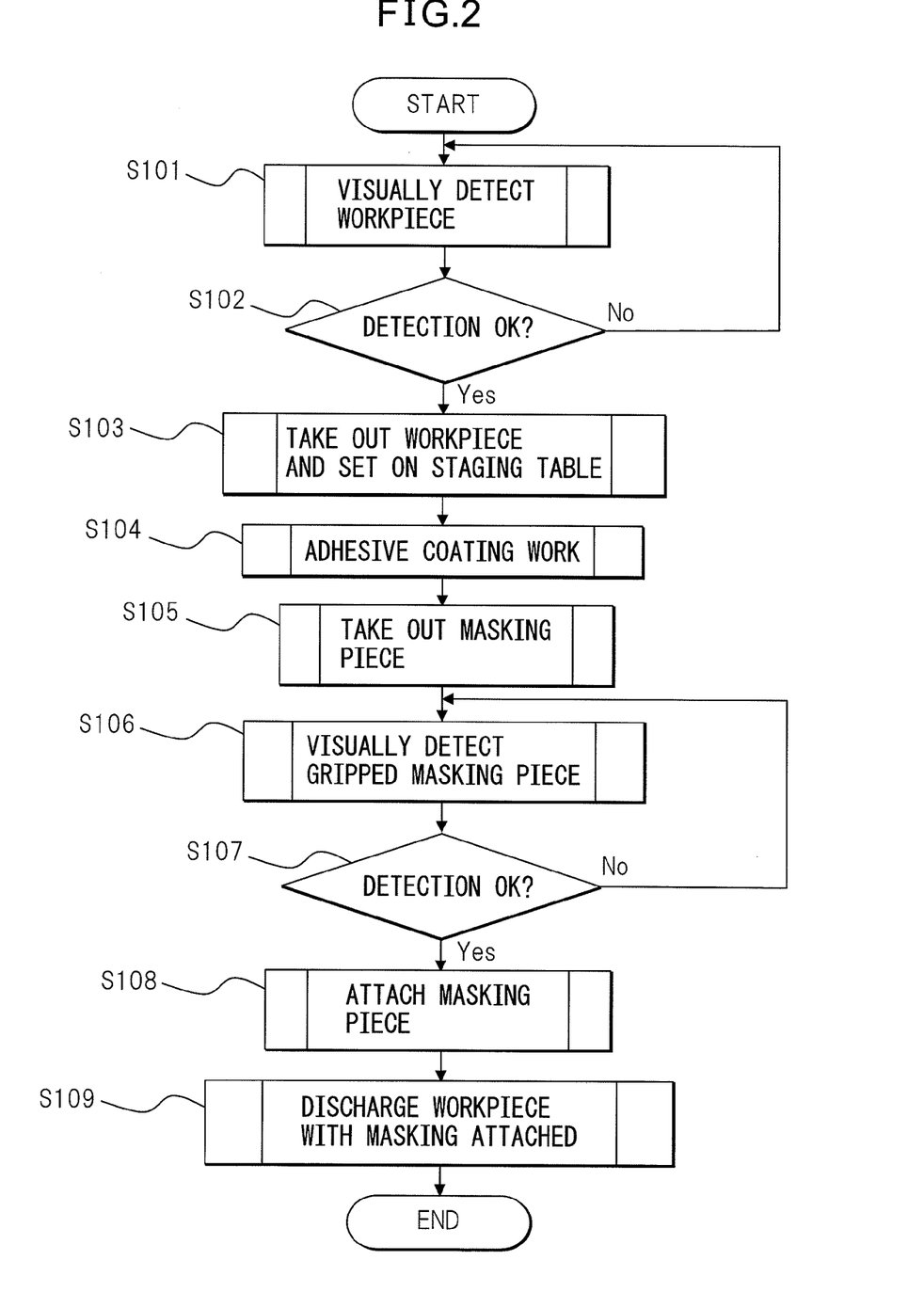
FIG. 2 is a flow chart showing the operation of the masking system shown in FIG. 1.
Figure 3:
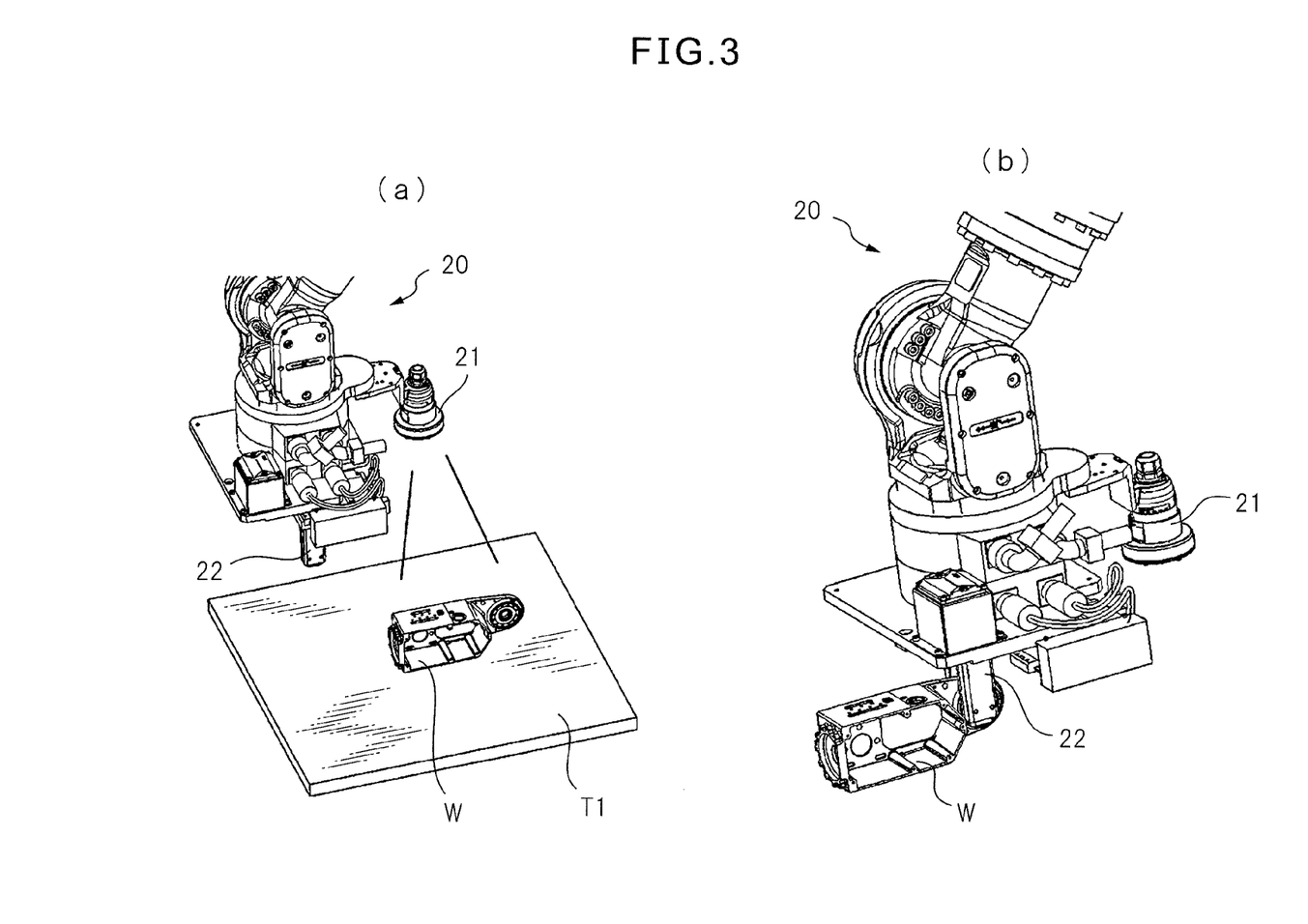
FIG. 3A is a first view for explaining the operation of the masking system.
FIG. 3B is a second view for explaining the operation of the masking system.
Figure 4:
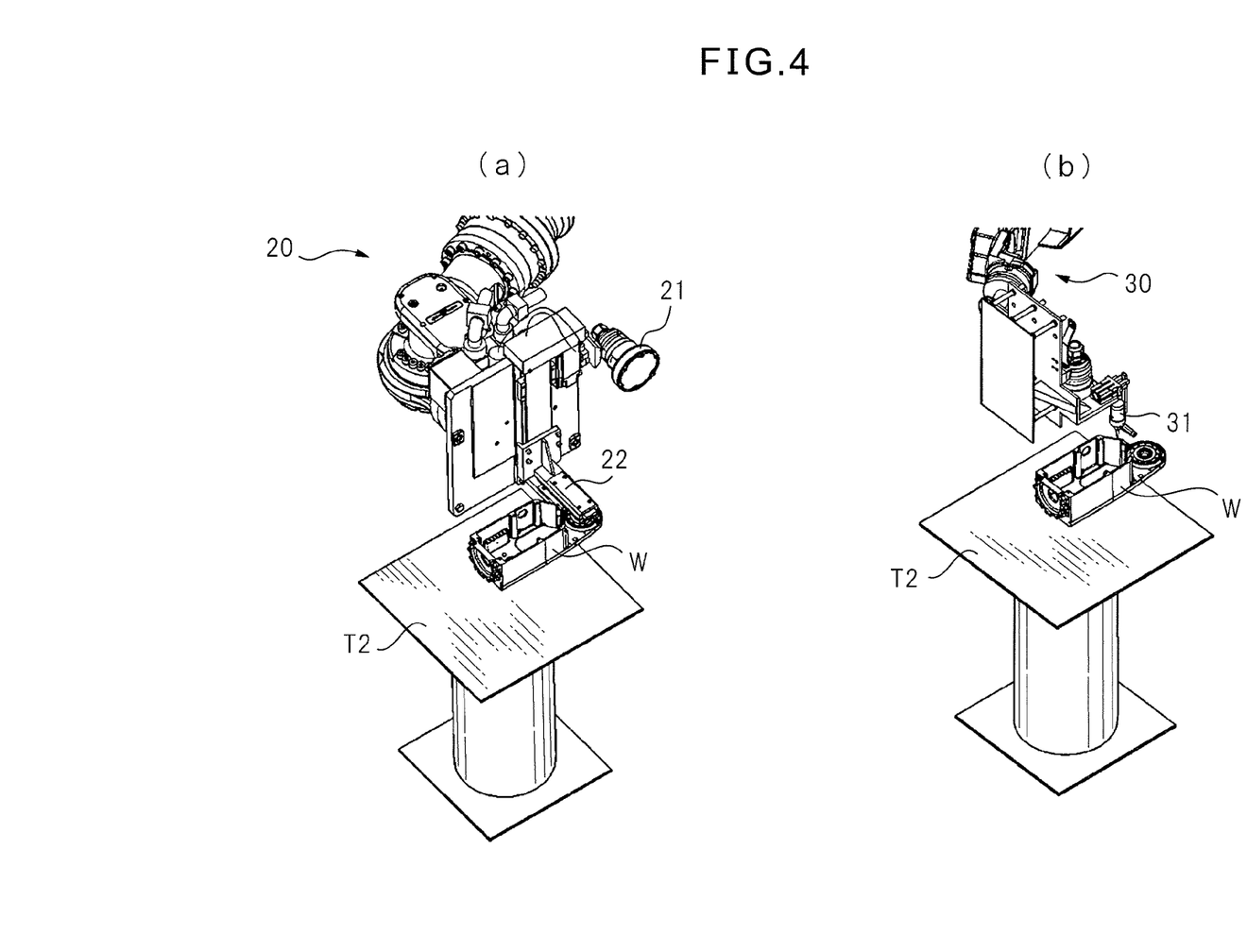
FIG. 4A is a third view for explaining the operation of the masking system.
FIG. 4B is a fourth view for explaining the operation of the masking system.
Figure 5:
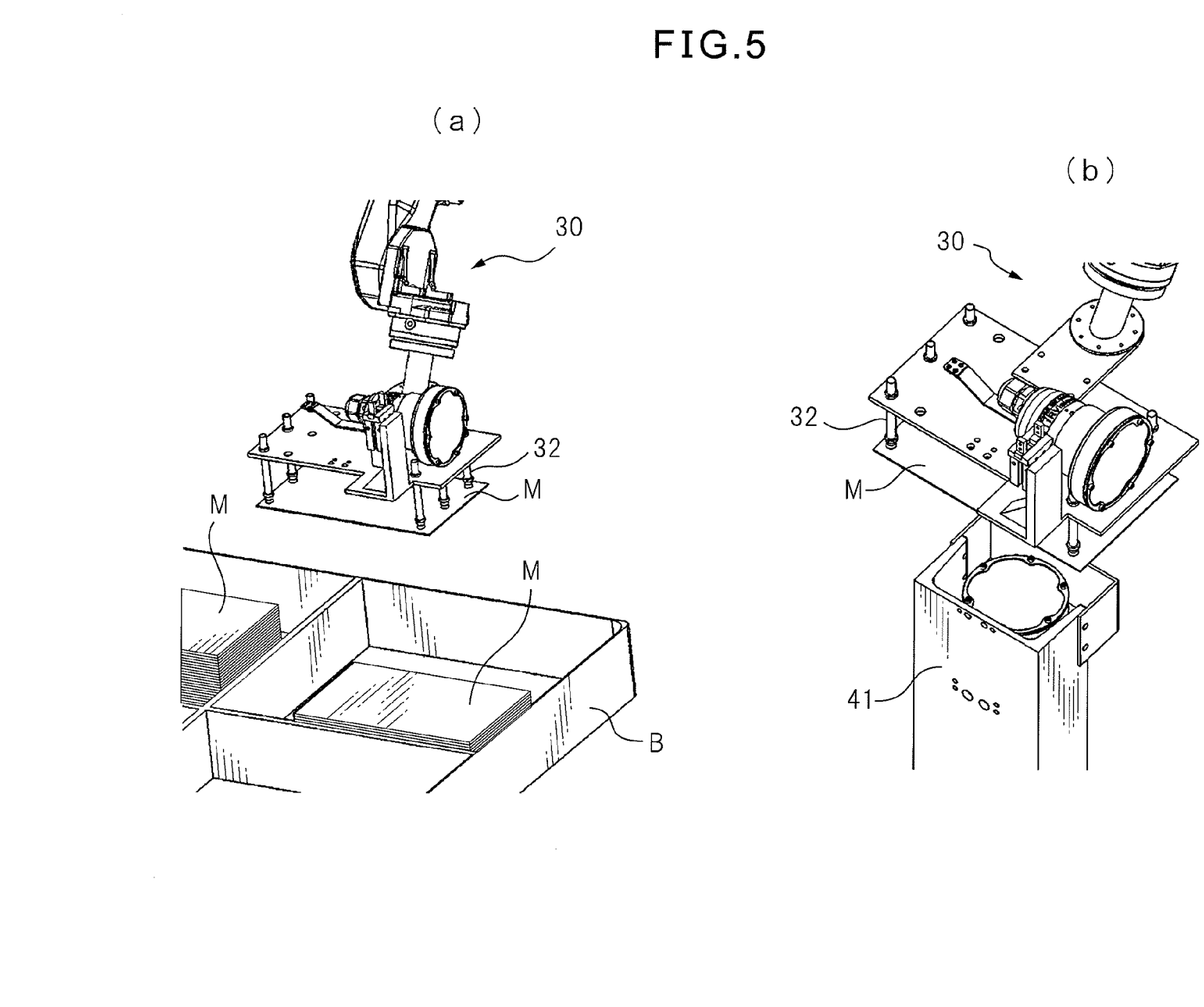
FIG. 5A is a fifth view for explaining the operation of the masking system.
FIG. 5B is a sixth view for explaining the operation of the masking system.
Figure 6:
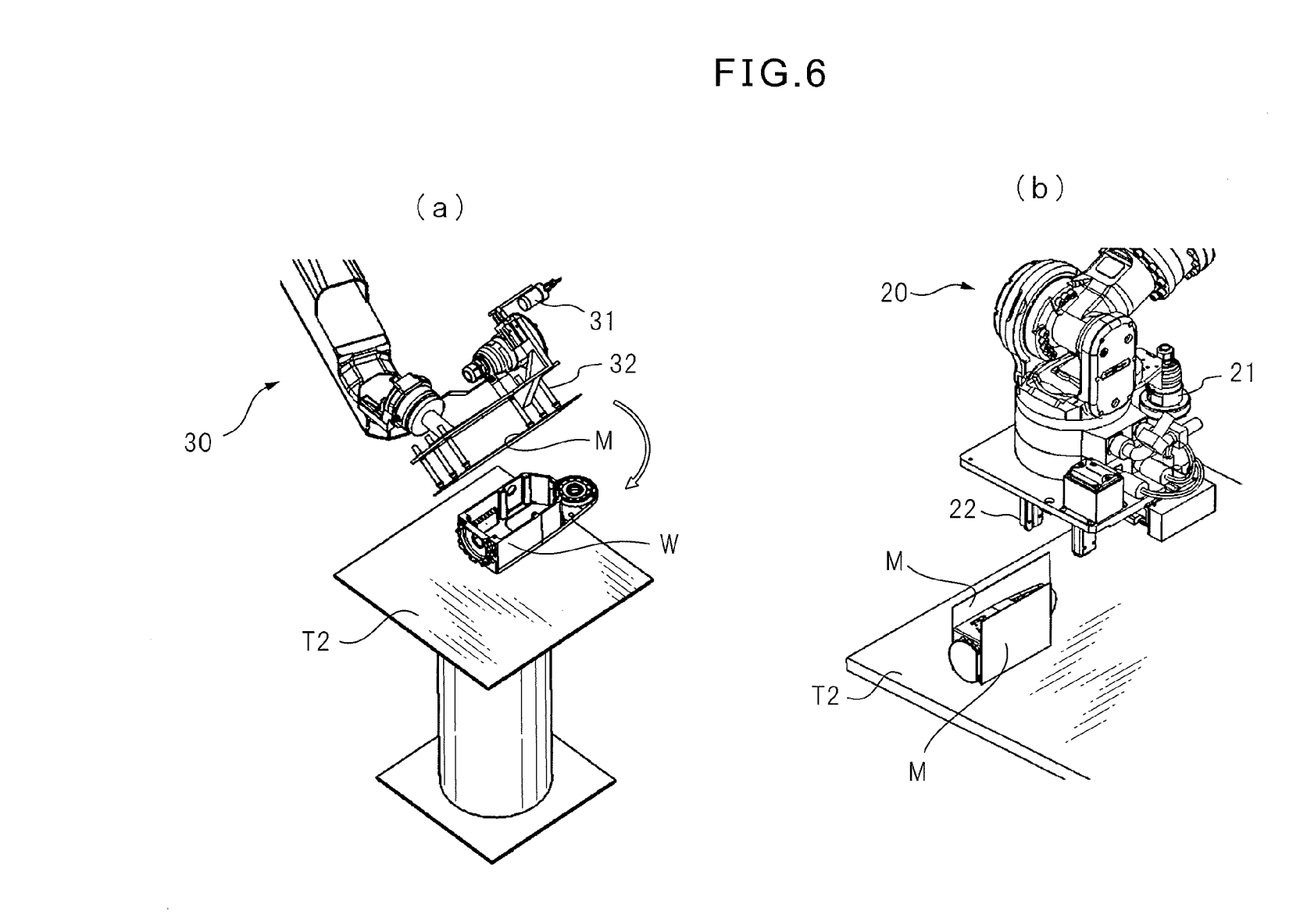
FIG. 6A is a seventh view for explaining the operation of the masking system.
FIG. 6B is an eighth view for explaining the operation of the masking system.

FIG. 2 is a flow chart showing the operation of the masking system shown in FIG. 1. Further, FIG. 3A to FIG. 6B are views for explaining the operation of the masking system. Below, the operation of the masking system 10 of the present invention will be explained while referring to the drawings.

Note that, in the present invention, the operation of the masking system 10 performed by the first robot 20 and second robot 30 includes first conveyance work of taking out a workpiece and conveying it to a predetermined position, coating work of coating the workpiece with an adhesive, and second conveyance work of taking out a masking piece and attaching it to the workpiece. Further, when these works are finished, the workpiece with the masking piece attached to it is unloaded from the masking system and separately painted by a painting system.

At step S101 of FIG. 2, the workpiece W is detected by the first vision sensor 21. As shown in FIG. 3A, the first robot 20 is made to move to the table T1 where the first vision sensor 21 of the first robot 20 captures the image of the workpiece W. Further, the robot controller 11 calculates the position and posture of the workpiece W based on the image of the workpiece W, whereupon it is judged that detection of the workpiece W has ended (step S102).

Then, the first robot 20 is made to move based on the position and posture of the workpiece W to a position suitable for the hand 22 of the first robot 20 to grip the workpiece W. Then, as shown in FIG. 3B, the workpiece W is made to be gripped by the hand 22 of the first robot 20, then the first robot 20 conveys the workpiece W to the staging table T2. Then, as shown in FIG. 4A, the first robot 20 sets the workpiece W on the staging table T2 (step S103). Further, after the hand 22 is opened, the first robot 20 is made to retract to its initial position. Below, the work of conveying and setting the workpiece W from the table T1 to the staging table T2 will be called the "first conveyance work".

The positional relationship between the table T1 and the staging table T2 and the shape and dimensions of the workpiece W are already known, so the position and posture of the workpiece W on the staging table T2 are calculated based on the distance of movement of the first robot 20 from its initial position. Then, the second robot 30 is made to move to the staging table T2. Further, as shown in step S104 and FIG. 4B, the coating unit 31 of the second robot 30 is started up to coat an adhesive at a desired location of the workpiece W in exactly the desired amount (hereinafter simply referred to as the "coating work").

When the coating work ends, the second robot 30 is made to move from the staging table T2 to the holding box B. Inside the holding box B, a plurality of masking pieces M are arranged stacked together. In step S105 and FIG. 5A, the suction part 32 of the second robot 30 is started up to pick up by suction one masking piece M from the holding box B.

Then, the second robot 30 makes the masking piece M which has been picked up by suction move to the second vision sensor 41. Further, as shown in step S106 and FIG. 5B, the second vision sensor 41 captures an image of the workpiece W picked up by suction by the suction part 32 of the second robot 30. Due to this, the robot controller 11 calculates the position and posture of the workpiece W based on the image of the workpiece W. Further, when the position and posture of the workpiece W are calculated, it is judged that the detection of the workpiece W has ended (step S107).

Then, as shown in step S108 and FIG. 6a, the second robot 30 is made to move to the staging table T2. Further, the second robot 30 attaches the masking piece M to the location of the workpiece W where the adhesive is coated based on the position and posture of the workpiece W and the position and posture of the masking piece M on the staging table T2. In the present invention, an adhesive is used to attach the masking piece M to the workpiece W, so the masking piece M can be easily attached to all sorts of workpieces W without regard as to the materials or shapes of the workpieces W.

After this, the second robot 30 is made to retract to its initial position and the first robot 20 is made to move to the staging table T2. Further, the hand 22 of the first robot 20 grips the workpiece W with the masking piece M attached and unloads it from the staging table T2. The masking piece M is used so that the workpiece W is provided with a noncoated location. Therefore, in the later coating process, the workpiece W can be coated at places other than the noncoated location.

In this way, in the present invention, the first conveyance work, the second conveyance work, and the coating work are performed by the first robot 20 and the second robot 30. Therefore, without requiring skill on the part of the worker, the masking piece M can be attached to the workpiece W with a high precision. Furthermore, in the present invention, the time required for masking work can be greatly shortened compared with when a worker uses masking tape, therefore the production capability can be raised. Further, the masking piece M is, for example, inexpensive cardboard, so it will be understood that compared with when using expensive masking tape etc., the masking work can be performed inexpensively.

Note that, in the embodiment explained from FIG. 2 to FIG. 6B, the first robot 20 and the second robot 30 are used. However, a single robot may also perform the first and second conveyance works and the coating work. In this case, it is possible to reduce the space required for the masking system 10. Further, the first and second conveyance works and the coating work may be performed by three separate robots. In this case, it will be understood that the time required for the masking work can be further shortened.

Figure 7:
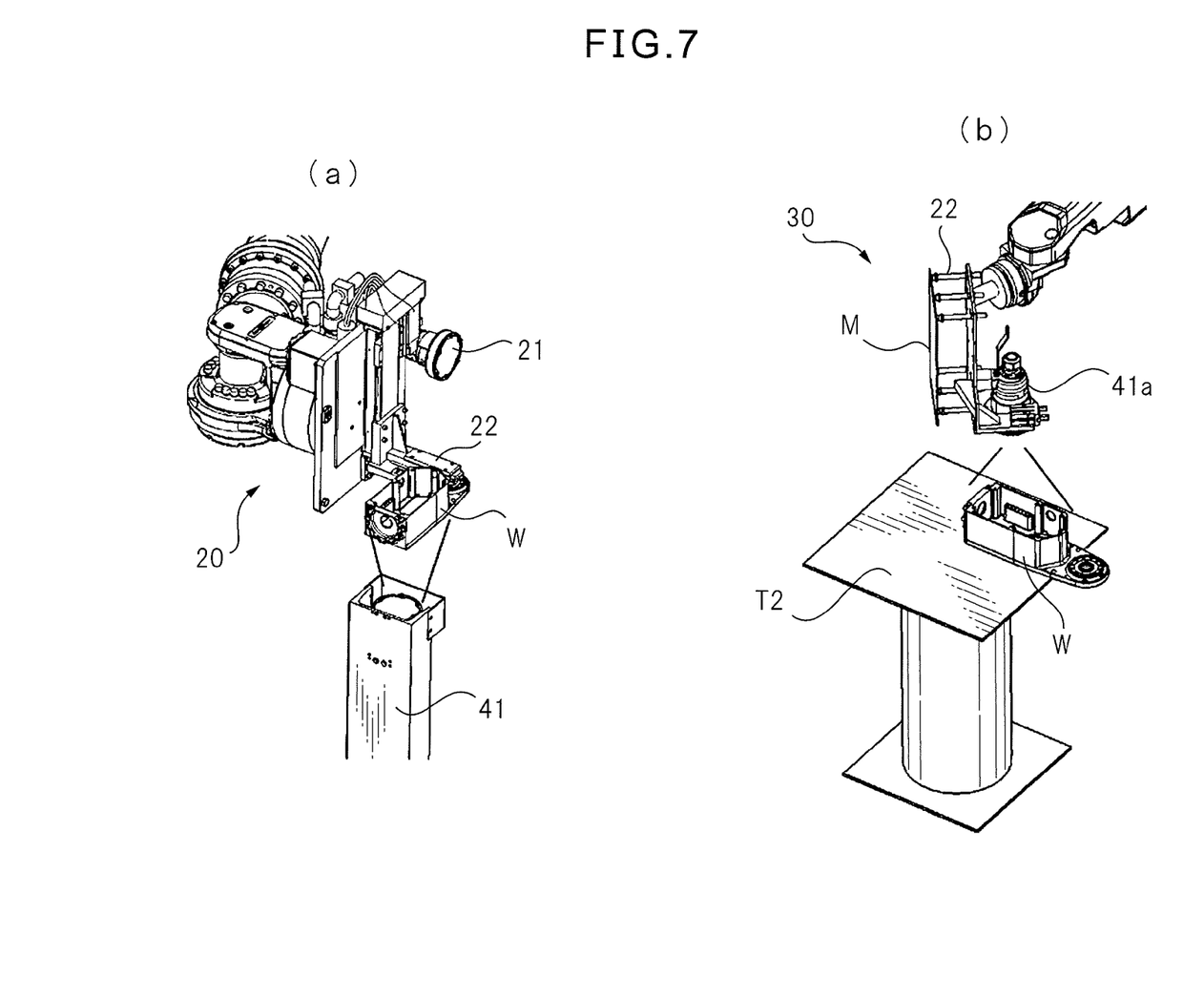
FIG. 7A is a first view for explaining the operation of the masking system in another embodiment.
FIG. 7B is a second view for explaining the operation of the masking system in another embodiment.

In this regard, FIG. 7A is a view for explaining the operation of the masking system in another embodiment. In FIG. 7A, the image of workpiece W which is gripped by the hand 22 of the first robot 20 is captured by the second vision sensor 41. This step is preferably performed between step S102 and step S103 shown in FIG. 2. Due to this, it is possible to calculate the position and posture of the workpiece W actually gripped by the hand 22, so when placing the workpiece W on the staging table T2, the precision of positioning of the workpiece W can be further improved.

Further, FIG. 7B is a view for explaining the operation of the masking system in still another embodiment. In FIG. 7B, the second robot 30 is provided with an additional vision sensor 41a. Between step S103 and step S104 shown in FIG. 2, the additional vision sensor 41a captures an image of the workpiece W carried on the staging table T2. Due to this, it becomes possible to calculate the position and posture of the workpiece W carried on the staging table T2, so the coating work of coating the workpiece W with an adhesive can be performed with further higher precision.

Figure 8:
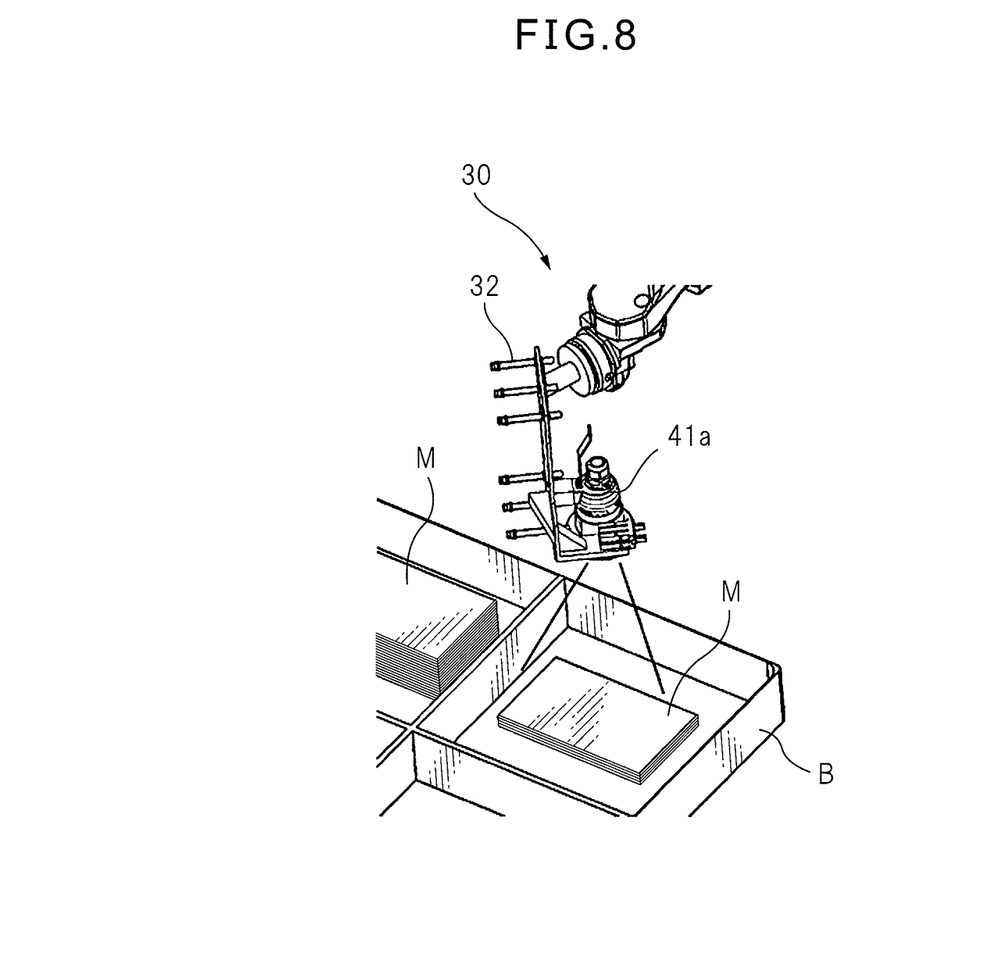
FIG. 8 is a third view for explaining the operation of the masking system in another embodiment.

Furthermore, FIG. 8 is a view for explaining the operation of the masking system in another embodiment. In FIG. 8 as well, the second robot 30 is provided with an additional vision sensor 41a. Between step S104 and step S105 shown in FIG. 2, the additional vision sensor 41a captures an image of the masking pieces M inside the holding box B. Due to this, it becomes possible to take out a masking piece M from the holding box B with a high precision. It will be understood that this is particularly advantageous where there is a variation in position in the masking pieces M inside the holding box B.

EFFECTS OF INVENTION

In the first aspect, the first conveyance work, the second conveyance work, and the coating work are performed by robots, so it is possible to attach a masking piece to an object with a high precision without requiring skill on the part of the worker. Furthermore, since an adhesive is used to attach the masking piece, the masking piece can be easily attached to all sorts of objects without regard as to the materials or shapes of the objects and high quality painting can be realized. Furthermore, the time requiring for the masking work can be greatly shortened compared with the case of the work being performed by a worker using masking tape, therefore the production capability is improved.

In the second aspect, it is possible to easily improve the adhesion.

In the third aspect, it is possible to perform the masking work inexpensively compared with when using expensive masking tape etc.

In the fourth aspect, it is possible to keep down the load on the environment at the time of disposing of the adhesive.

In the fifth aspect, it is possible to use a plurality of robots so as to further shorten the time required for work.

While typical embodiments were used to explain the present invention, a person skilled in the art would understand that the above-mentioned changes and other changes, deletions, and additions can be made without departing from the scope of the present invention.

The invention claimed is:

1. A method, comprising:
   detecting a position of an object at a first position, thereby obtaining first positional information of the object;
   robotically gripping a masking piece;
   detecting a position of said masking piece which is gripped, thereby obtaining second positional information of the masking piece;
   robotically gripping the object with a robotic device based on the detected position of the object;
   setting the object at a predetermined position different from the first position based on the first positional information;
   directly coating an adhesive on a masking location of the object while the object is set at the predetermined position; and
   adhering said masking piece to the masking location of said object based on the second positional information.

2. The method of claim 1, wherein the action of setting the object at a predetermined position different from the first position based on the first positional information is executed by a robot and corresponds to a performance of a first conveyance work executed by the robot.

3. The method of claim 1, wherein the action of adhering said masking piece to the masking location of said object based on the second positional information is executed by a robot and corresponds to a performance of a second conveyance work executed by the robot.

4. The method of claim 1, wherein the action of directly coating an adhesive on a masking location of the object while the object is set at the predetermined position is executed by a robot.

5. The method of claim 1, wherein said adhesive is water soluble and has the property of increasing in viscosity by a decrease in water content and wherein said masking piece includes a water absorbing material.

6. The method of claim 1, wherein the masking piece is cardboard.

7. The method of claim 1, wherein the adhesive is a material mainly comprised of natural rubber latex.

8. The method of claim 1, wherein the actions of (i) setting the object at a predetermined position different from the first position based on the first positional information, and (ii) adhering said masking piece to the masking location of said object based on the second positional information, are executed by different robots.

9. The method of claim 5, wherein the actions of (i) setting the object at a predetermined position different from the first position based on the first positional information, and (ii) adhering said masking piece to the masking location of said object based on the second positional information, are executed by different robots.

10. The method of claim 6, wherein the actions of (i) setting the object at a predetermined position different from the first position based on the first positional information, and (ii) adhering said masking piece to the masking location of said object based on the second positional information, are executed by different robots.

11. The method of claim 1, further comprising:
using a robot controller to control a robot system including a plurality of robots to execute the actions of:
detecting a position of an object at a first position, thereby obtaining first positional information of the object;
robotically gripping a masking piece;
detecting a position of said masking piece which is gripped, thereby obtaining second positional information of the masking piece;
robotically gripping the object with a robotic device based on the detected position of the object;
setting the object at a predetermined position different from the first position based on the first positional information;
directly coating an adhesive on a masking location of the object while the object is set at the predetermined position; and
adhering said masking piece to the masking location of said object based on the second positional information.

12. A method, comprising:
detecting a position of an object at a first position, thereby obtaining first positional information of the object;
gripping a masking piece;
detecting a position of said masking piece which is gripped, thereby obtaining second positional information of the masking piece;
gripping the object with a robotic device based on the detected position of the object;
setting the object at a predetermined position different from the first position based on the first positional information;
directly coating an adhesive on a masking location of the object while the object is set at the predetermined position; and
adhering said masking piece to the masking location of said object based on the second positional information, wherein at least one of:
setting the object at a predetermined position different from the first position based on the first positional information;
directly coating an adhesive on a masking location of the object while the object is set at the predetermined position; or
adhering said masking piece to the masking location of said object based on the second positional information, are executed by a robot.

13. The method of claim 12, wherein at least two of:
setting the object at a predetermined position different from the first position based on the first positional information;
directly coating an adhesive on a masking location of the object while the object is set at the predetermined position; or
adhering said masking piece to the masking location of said object based on the second positional information, are executed by the same robot.

14. The method of claim 12, wherein:
setting the object at a predetermined position different from the first position based on the first positional information; and
adhering said masking piece to the masking location of said object based on the second positional information, are executed by different robots.

15. The method of claim 12, wherein the action of detecting a position of an object, thereby obtaining first positional information of the object, is executed utilizing a vision sensor.

16. The method of claim 12, further comprising:
utilizing a robot system including a plurality of robots linked to a robot controller to execute the actions of:
detecting a position of an object at a first position, thereby obtaining first positional information of the object;
gripping a masking piece;
detecting a position of said masking piece which is gripped, thereby obtaining second positional information of the masking piece;
gripping the object with a robotic device based on the detected position of the object;
setting the object at a predetermined position different from the first position based on the first positional information;
directly coating an adhesive on a masking location of the object while the object is set at the predetermined position; and
adhering said masking piece to the masking location of said object based on the second positional information.

* * * * *